US011234413B2

(12) United States Patent
Trottier et al.

(10) Patent No.: US 11,234,413 B2
(45) Date of Patent: Feb. 1, 2022

(54) SPIRALING FRUSTOCONICAL DISPENSER (71) Applicant: CLEVERPET, INC, San Diego, CA (US)

(72) Inventors: Leo Trottier, San Diego, CA (US); Daniel Knudsen, San Diego, CA (US); Jarrod Barker, Richmond (AU); Rodney Brown, Richmond (AU); Aaron Nott, Richmond (AU)

(*) Notice: Subject to any disclaimer, the term of this patent is extended or adjusted under 35 U.S.C. 154(b) by 58 days.

(21) Appl. No.: 16/896,042

(22) Filed: Jun. 8, 2020

(65) Prior Publication Data
US 2020/0337265 A1 Oct. 29, 2020

Related U.S. Application Data (63) Continuation of application No. 15/507,720, filed as application No. PCT/US2015/047431 on Aug. 28, 2015, now abandoned.

(60) Provisional application No. 62/045,262, filed on Sep. 3, 2014, provisional application No. 62/044,104, filed on Aug. 29, 2014.

(51) Int. Cl.
A01K 5/02 (2006.01)
B65D 83/04 (2006.01)
A01K 5/01 (2006.01)

(52) U.S. Cl.
CPC .......... A01K 5/0233 (2013.01); A01K 5/0114 (2013.01); B65D 83/0409 (2013.01)

(58) Field of Classification Search
CPC . A01K 5/0233; A01K 5/0114; B65D 83/0409
See application file for complete search history.

(56) References Cited

U.S. PATENT DOCUMENTS

| 3,156,279 | A | | 11/1964 | Grebowiec et al. |
| 3,439,827 | A | | 4/1969 | Marland |
| 4,688,520 | A | | 8/1987 | Parks |
| 5,054,657 | A | | 10/1991 | Morse et al. |
| 5,337,915 | A | | 8/1994 | Hall, Jr. |
| 5,634,569 | A | | 6/1997 | Decoster |
| 5,765,676 | A | * | 6/1998 | Kalm ................ B65G 47/1428 198/396 |
| 5,884,806 | A | | 3/1999 | Boyer et al. |
| 6,135,056 | A | | 10/2000 | Kuo |
| 6,161,503 | A | | 12/2000 | Blas |

(Continued)

FOREIGN PATENT DOCUMENTS

EP 1195085 A2 10/2002

OTHER PUBLICATIONS

International Search Report and Written Opinion; dated Nov. 23, 2015; 9 pages; International Searching Authority, Korean Intellectual Property Office.

Primary Examiner — Michael Collins
(74) Attorney, Agent, or Firm — Coleman & Horowitt, LLP; Sherrie M. Flynn (57) ABSTRACT A device for sequentially dispensing individual objects includes a housing having a first housing portion which is conically-shaped. The first housing portion has a first end proximate a supply of objects and a second end proximate a location where the objects are to be dispensed. There is a spiral race, disposed on an interior surface of the first housing portion and extending from the first end to the second end of the first housing portion, along which the objects to be dispensed travel.

19 Claims, 10 Drawing Sheets (56) References Cited

U.S. PATENT DOCUMENTS

| | | | |
|---|---|---|---|
| 6,367,611 B1* | 4/2002 | Kuenzler | B65G 47/1428 |
| | | | 198/389 |
| 6,701,866 B1 | 3/2004 | Shieh | |
| 6,745,918 B2 | 6/2004 | Greene | |
| 7,487,878 B2 | 2/2009 | Giwargis et al. | |
| 7,624,894 B2 | 12/2009 | Gerold et al. | |
| 8,517,214 B2 | 8/2013 | Lowry et al. | |
| 8,523,013 B2 | 9/2013 | Sines | |
| 8,540,119 B2* | 9/2013 | Gunstad | G07F 11/50 |
| | | | 222/63 |
| 8,757,053 B2 | 6/2014 | Gonzalez | |
| 8,919,534 B1 | 12/2014 | Evans | |
| 9,022,258 B2* | 5/2015 | Nehren | B29B 7/80 |
| | | | 222/390 |
| 9,347,964 B2* | 5/2016 | Schacher | B65G 47/1428 |
| 9,446,904 B2 | 9/2016 | Koenigsknecht et al. | |
| 9,896,260 B2 | 2/2018 | Sines | |
| 10,124,918 B2 | 11/2018 | Scheu | |
| 2007/0062967 A1 | 3/2007 | Zaidman et al. | |

* cited by examiner

SPIRALING FRUSTOCONICAL DISPENSER

CROSS REFERENCE TO RELATED APPLICATION

This application is a continuation of U.S. application Ser. No. 15/507,720, filed Feb. 28, 2017, which is a U.S. National Phase application of and claims priority pursuant to 35 U.S.C. § 371 to PCT/US2015/047431 filed Aug. 28, 2015, which claims priority pursuant to 35 U.S.C. § 119(e) to U.S. Provisional Application No. 62/045,262, filed Sep. 3, 2014 and U.S. Provisional Application No. 62/044,104, filed Aug. 29, 2014, all of which are incorporated herein by reference in their entireties.

FIELD OF INVENTION

The present device relates to the dispensing of items from an available plurality of items and more particularly to a device for dispensing individual pieces of food in an interactive animal training system.

BACKGROUND

Dispensing apparatus for objects have been developed over the years in many configurations. In the case of the dispensing of food in small sizes, for instance gum balls dispensed in candy dispensers, and as shown herein, kibble and animal treats dispensed from a supply of such, the majority of such dispensing devices are not well adapted to dispense a single item, when the supply of such items, for instance as noted dry kibble for dogs and cats, comes in a large stacked or reservoir-held supply. Using the example of kibble, because it is lightweight, dry, and generally within a small deviation in size, dispensers such as shoveling devices, or drop-filling devices, are generally unable to dispense a single kibble, repeatedly. Herein, the process of sequentially dispensing a single item from a larger supply of such items is known as "singulation" and systems that do this are said to "singulate".

Further, when the housed-supply is of unequal or numerous sizes, dispensing devices, especially in the noted arena of pet food dispensers, are unable to sort the housed-supply to deliver smaller, or larger sized individual kibble, or item, from the mix of sizes. Further, the ability to repeat this sorting where a single maximum or minimum sized object, from a stored supply of such objects in varying sizes, and to do so repeatedly, while concurrently dispensing a single unit at a time, is not found in the prior art.

As such, there is an unmet need for a dispensing device, which is employable to dispense individual units, from communicable supplies of a product or material, stored for such dispensing. Such a device should be employable to repeatedly, and reliably dispense, a single unit from the supply of food, or other material being dispensed whether the supply thereof is heterogeneous or homogeneous in nature. In addition to singular repeated sequential delivery, such a device ideally also should be mechanically and operably configurable, to sort the available supply of such material by size, and to then dispense individual units of substantially the same size from the available supply, while rejecting the units of material which are either larger or smaller than is wanted for dispensing. Still further, such a device should be able to concurrently sort the dispensed material to size and concurrently deliver individual units thereof, singularly and sequentially, as needed, and do so reliably.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings. Further, while the device and method herein are directed to the dispensing of food for animals from a supply thereof available for ease of understanding of the principals of operation of the device, in no manner should such be considered limiting and those skilled in the art will immediately ascertain on reading this disclosure other modes of employment of the dispensing apparatus. All such uses and deployments as would occur to those skilled in the art, are considered to be within the scope of this application.

SUMMARY OF INVENTION

It is an object of the present invention to provide a dispensing component which may be adapted for use with any dispensing apparatus or may be employed by itself for singular dispensing sequentially of individual objects from a supply thereof.

It is an object of the present invention to provide a device and method which will reliably and sequentially deliver or dispense, single individual items from a supply thereof, irrespective of whether the supply is formed of a heterogeneous or homogeneous mix of the items being delivered.

It is an additional object of this invention to provide such a dispensing component which may also be mechanically, or operationally, configured to sort the material dispensed and deliver individual units thereof, sequentially and substantially of a determined size.

In accordance with the invention, there is a device employing a spiraling frustoconical race to communicate individual items to a dispensing end, from a reservoir of such items located at a lower end of the device. Additionally, the dispensing apparatus is configurable to provide a sorting of the available supply of items fed to the race by size, depending on the actual configuration and rotational speed of the device in operation. While employable to sort or dispense individual items from a supply thereof for a multitude of purposes, the device herein is currently adapted for the dispensing of kibble or dry pet or dog treats although those skilled in the art will recognize numerous other applications which are considered within the scope of this application.

In accordance with the purposes of the present invention, as embodied and broadly described herein, the present invention provides a device and method for the reliable sequential dispensing of respective individual objects or items, from a communicable supply of such items or objects. The device can be employed by itself, once placed in communication with a supply of objects to be dispensed, or, it may be employed in operational engagement with any component or machinery required to singulate, or sequentially dispense individual items or objects, from the available communicated supply thereof to be dispensed.

In a mode disclosed herein for the dispensing of pet treats or food, for a convenient understanding of the invention and its operation, the device is employable to dispense individual dry pet treats or kibble, from a supply thereof available. In operation generally, individual objects from the supply available are repeatedly dispensed and as shown herein used for dispensing individual dog treats or kibble, individual pieces of the dry kibble or treats, can be operatively dispensed by the device upon initiation of operation by communicating power to a motor which will operate the device to dispense.

Shown in the various figures, the device whether employed as a unitary dispensing component or in combination with machinery adapted to dispense, is formed as a frustoconical housing which is adapted for rotation when operatively engaged to a dispensing apparatus. The housing features a novel spiral race extending from a first side edge engaged with the interior surface of the sidewall of an interior cavity of the housing, defined by the sidewall. The race extends to a distal edge a distance away from the engagement with the sidewall of the housing. So engaged, the race follows a spiral pathway within the interior cavity from the widest portion of the frustoconical housing, to an aperture located at the opposite and narrower end of the housing.

The housing is engaged to rotate along a central axis which is positioned at an inclining angle placing the narrower end of the housing elevated above the wider end of the housing. During rotational movement of the housing around its axis, imparted by energizing an operatively engaged electric motor, the race on the interior cavity which is in communication with the supply of individual objects to be dispensed within the wider end of the interior cavity, through a frictional engagement with individual pieces or objects, will transport respective individual objects or pieces upward within the interior cavity along the spiral race.

Upon reaching the aperture located at the elevated narrow end of the housing, the individual objects, or in this case, pieces of kibble, are ejected from the housing through the aperture. Once ejected from the interior cavity by the motion of the race, the objects may be dispensed using the force of the falling object to operatively dispense it.

As shown herein in use in operative engagement with a dispensing apparatus, a chute is positioned in operative engagement with the aperture of the device whereby ejected objects such as kibble from the supply within the housing, are directed during falling to a bowl. In the mode herein to dispense pet food or treats, the bowl receiving the falling kibble may be initially positioned out of reach of the animal and thereafter positioned for consumption of the kibble in the bowl, by translation of the bowl from a covered position to an uncovered position wherein the animal, such as a dog, may eat and enjoy the dispensed food or treat.

While as noted the device is employable to dispense individual units from any heterogeneous or homogeneous supply of such, the device may also be employed to sort and dispense one size range of objects from a supply having varying sizes of such which is housed within the wider end of the interior cavity. The size elevated and ejected by the spiral race, can be limited by the distance of extension of the race from the interior sidewall of the housing. Such may be adjusted to cause differing sizes to be transported up the race while others are rejected due to falling from an elevated position on the race which is sized to cause such a tumble. Additionally, the rotational speed of the housing, and thus the speed of the race, can be adjusted to enhance such a sorting due to gravitational pull and sliding of individual objects on the race which are too large to be supported during the rotation of the housing.

In one aspect, the invention features a device for sequentially dispensing individual objects including a housing having a first housing portion which is conically-shaped. The first housing portion having a first end proximate a supply of objects and a second end proximate a location where the objects are to be dispensed. There is a spiral race disposed on an interior surface of the first housing portion and extending from the first end to the second end of the first housing portion, along which the objects to be dispensed travel.

In other aspects of the invention one or more of the following features may be included. The housing may comprise a second housing portion with a first end and a second end, wherein the first end of the first housing portion is interconnected with the first end of the second housing portion. The second housing portion may be frusto-conical in shape. The first housing portion and the second housing portion may be mechanically detachable. The second housing portion may have a hopper in its interior for holding a supply of objects and wherein a surface of the hopper may be angled to urge the objects toward the first housing portion. The second housing portion may include an opening with a mechanically detachable lid through which the supply of objects can be introduced to the hopper. The second housing portion may include a spiral race disposed on its interior surface which aligns with the spiral race disposed on the interior surface of the first housing portion; the second housing portion holding a supply of objects. The housing may have a longitudinal axis and the spiral race on the interior surface of the first housing portion is disposed about the longitudinal axis. The second housing portion may include a plurality of aggregating ribs on the interior surface of the second housing portion, the aggregating ribs having lengths substantially in a direction parallel to the longitudinal axis and widths substantially in a direction perpendicular to the longitudinal axis. The housing may have a longitudinal axis and the spiral races on the interior surfaces of the first and second housing portions are disposed about the longitudinal axis. The first and second housing portions may be frustoconical in shape. The first end of the first housing portion may be wider than the second end of first housing portion. The housing may be disposed on a mount to enable rotation of the housing about the longitudinal axis; wherein when the housing is rotated the objects to be dispensed travel from the hopper along the spiral race due to frictional engagement between the spiral race and the objects. The housing may be angled upwards, relative to a surface on which the device is disposed, from the second end of the second housing portion to the second end of the first housing portion. The second end of the first housing portion may comprise an opening for the exit of the objects. The objects to be dispensed may be particles of food and the particles may range from 0.4 cm to 4.0 cm. There may further be included a drive system configured to cause rotation of the housing. There may also be included a controller in communication with the drive system to control rotation of the housing to dispense objects from the opening in the second end of the first housing portion one object at a time. The spiral race may include a spiral wall extending from the interior surface of the first housing portion. The spiral wall may extend from the interior surface of the first housing portion is formed by indenting an exterior surface of the first housing portion.

In another aspect of the invention, there is a system for training animals, comprising a food container and an interactive device for providing stimulation to the animal in order to elicit a response from the animal. There is a dispensing device for sequentially dispensing individual particles of food to the food container in response to input from the interactive device. The dispensing device includes a housing having a first housing portion interconnected to a second housing portion. The first housing portion is conically-shaped and has a first end interconnected to the second housing portion and a second end proximate the food container. The first housing portion has a spiral race disposed on its interior surface extending from the first end to the second end of the first housing portion, and the second housing portion has a hopper in its interior for holding a supply of food particles. There is a mount on which the housing is rotatably mounted to enable rotation of the housing about a longitudinal axis of the housing. When the housing is rotated the food particles travel from the hopper along the spiral race due to frictional engagement between the spiral race and the food particles, until the particles are individually dispensed through an opening in the second housing portion to the food container.

In other aspects of the invention one or more of the following features may be included. The housing of the dispensing device may be detachable from the mount. The housing may be inclined at an upward angle from the second housing portion to the first housing portion. One or more of the following parameters may be adjusted to control the travel of food particles along the spiral race: the angle of incline of the housing, the rotational speed of the housing, and the height, pitch and frictional properties of the spiral race.

As noted while the frustoconical housing and narrowing-spiral race are shown in a mode for dispensing pet food or treats and used in combination with dispensing machinery, the device is capable of employment by itself to dispense single units from any supply thereof and also could be employed for any number of other dispensing and/or sorting tasks. Consequently, with respect to the above description, before explaining at least one preferred embodiment of the herein disclosed frustoconical dispensing and sorting device and method in detail, it is to be understood that the invention is not limited in its application to the details of construction and to the arrangement of the components in the following description or illustrated in the drawings. The frustoconical housing with spiral narrowing race may be adapted for use in various other modes and combinations and is also capable of other embodiments and of being practiced and carried out in various ways which will be obvious to those skilled in the art. Any such alternative configuration as would occur to those skilled in the art is considered within the scope of this patent. Also, it is to be understood that the phraseology and terminology employed herein are for the purpose of description and should not be regarded as limiting.

DESCRIPTION OF DRAWINGS

The accompanying drawings, which are incorporated herein and form a part of the specification, illustrate some, but not the only nor exclusive examples of embodiments and/or features of the disclosed frustoconical dispensing device and method. It is intended that the embodiments and figures disclosed herein are to be considered illustrative of the invention herein, rather than limiting in any fashion.

In the drawings.

DETAILED DESCRIPTION

Figure 1:
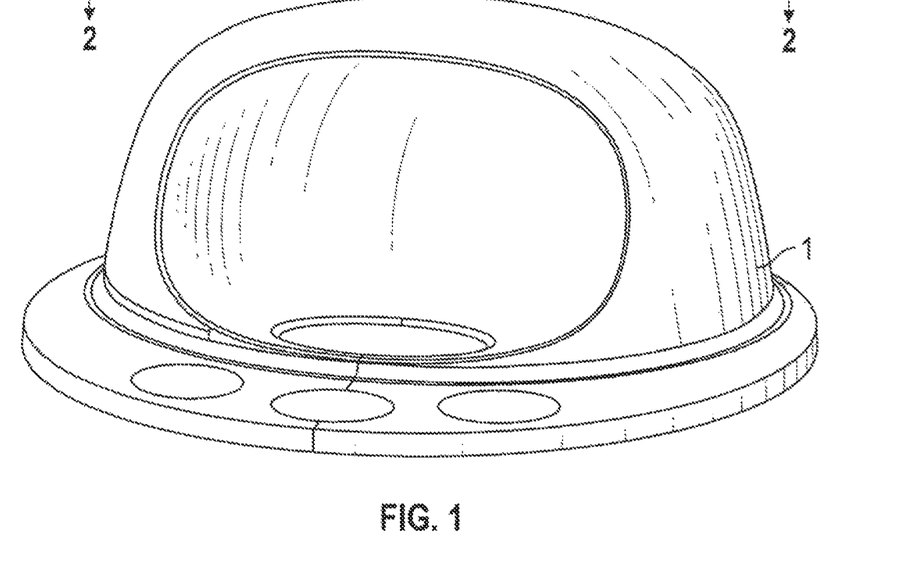
FIG. 1 depicts an isometric view of a dispensing device for pet food, having the frustoconical dispensing device herein in operative engagement therewith.
Figure 2:
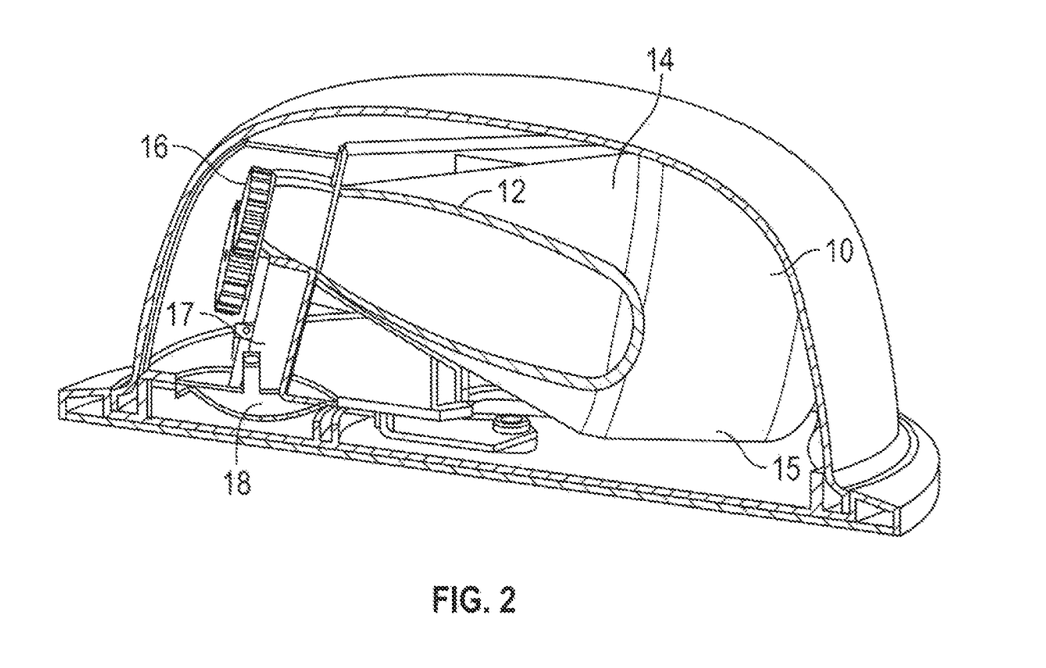
FIG. 2 shows a sectional view of FIG. 1, along line 2-2.

Now referring to drawings in FIGS. 1-13, wherein similar components are identified by like reference numerals, there is shown an exemplar dispensing device 10 which could be utilized in, for example, interactive animal training system 1, FIG. 1. As shown in FIG. 2, device 10 is operationally engageable for dispensing, using an inclined orientation of the first, narrower section 12 of the frustoconical housing 14, elevated above the wider, second section 15. So positioned in an incline, powered means for rotation such as the gears 16 operatively connected to a motor (not visible in FIG. 2) are employed to rotate device 10 to dispense and/or sort individual items, such as pieces of animal food. The items exit the first portion 12 proximate the narrow end and travel down a chute 17 and into dispensing bowl 18. The food in dispensing bowl 18 can be made accessible to an animal according to a desired feeding and/or training algorithm implemented by training system 1. Such a training system and algorithm is described in U.S. Provisional Application No. 62/045,262, filed on Sep. 3, 2014, and in PCT Application Serial No. PCT/US2015/047896, filed on Sep. 1, 2015.

Figure 3:
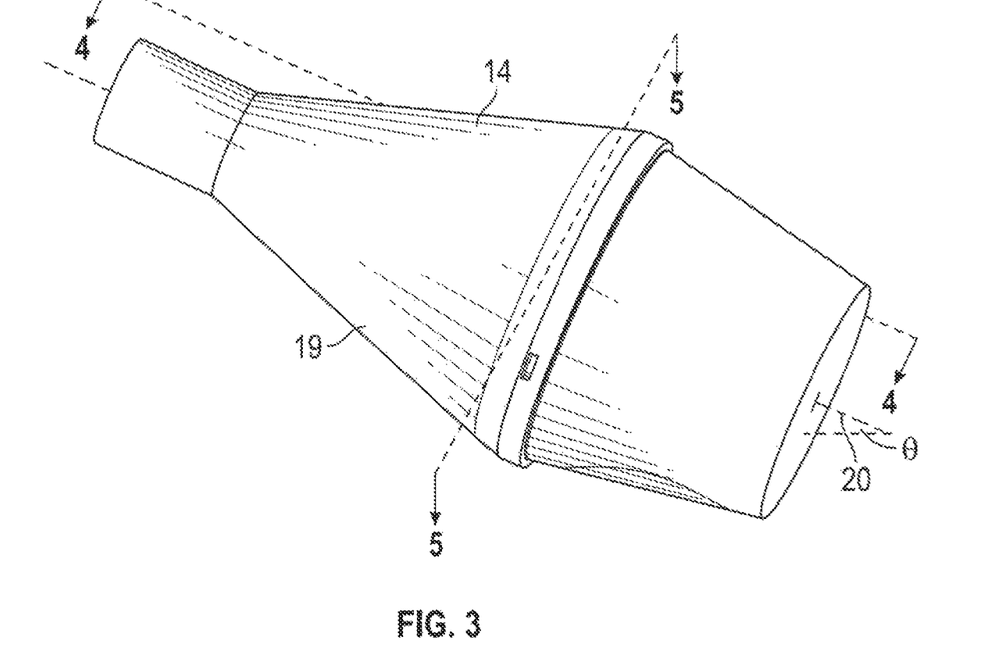
FIG. 3 depicts a view of the frustoconical housing device herein showing the sidewall forming the exterior surface and an inclined operational axis.

As seen in FIG. 3, frustoconical housing 14 of device 10 is defined by an exterior sidewall 19 forming the exterior surface of housing 14 and, as noted, may be employed for singular dispensing sequentially of individual units from any heterogeneous or homogeneous mix of material or objects, by itself, or in combination with other mechanical dispensing components as shown herein. In use singularly or in combination with another component, the incline shown in FIG. 2, is again depicted in FIG. 3 which shows the axis 20 running through the center of the housing 14, at an incline thereby elevating the first, narrower section 12 of the housing 14, above the wider, section 15. In all modes of operation some such incline is employed, however the angle of incline may be adjusted to help sort the material being dispensed, or to better deliver individual objects or pieces during operation.

Figure 4:
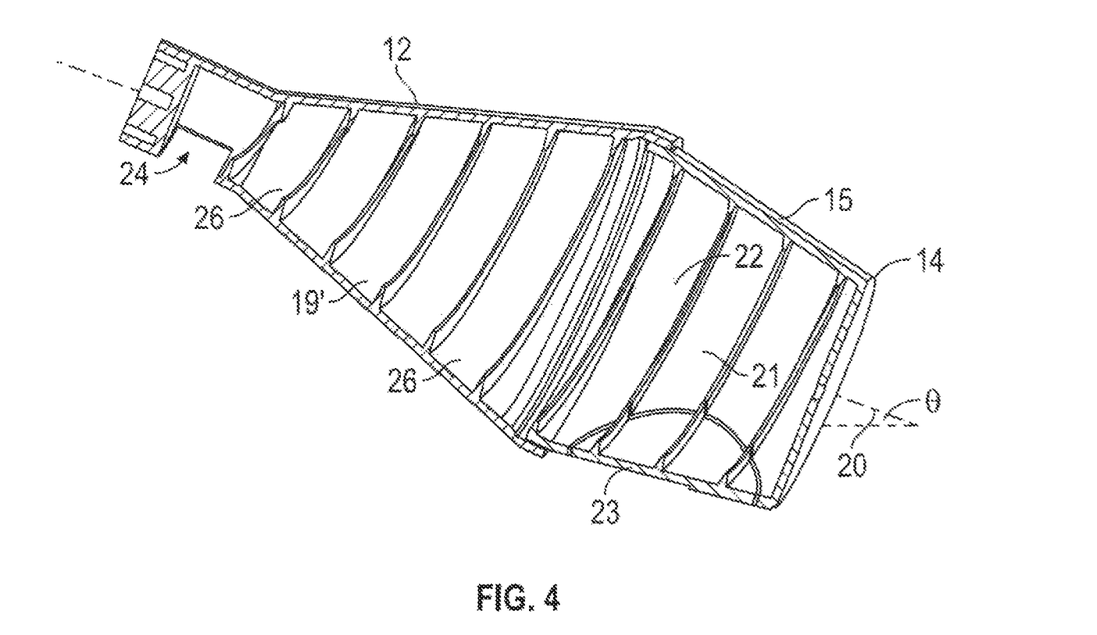
FIG. 4 shows a sectional view of FIG. 3, along line 4-4.

In FIG. 4 is depicted, a sectional view of FIG. 3, along line 4-4 thereof, showing the interior cavity 22 of the housing 14. The first section 12 removably engages with second section 15 and each section 12 and 15 may be frusto-conical in shape. Second frustoconical section 15 has a hopper portion 21 which is configured to hold the supply of material to be dispensed from the elevated aperture 24 after travel up the spiraling race 26. The lower section 15 is depicted with a mechanically removable door 23 through which new objects may be introduced into hopper portion 21 of the housing 14.

Figure 5:
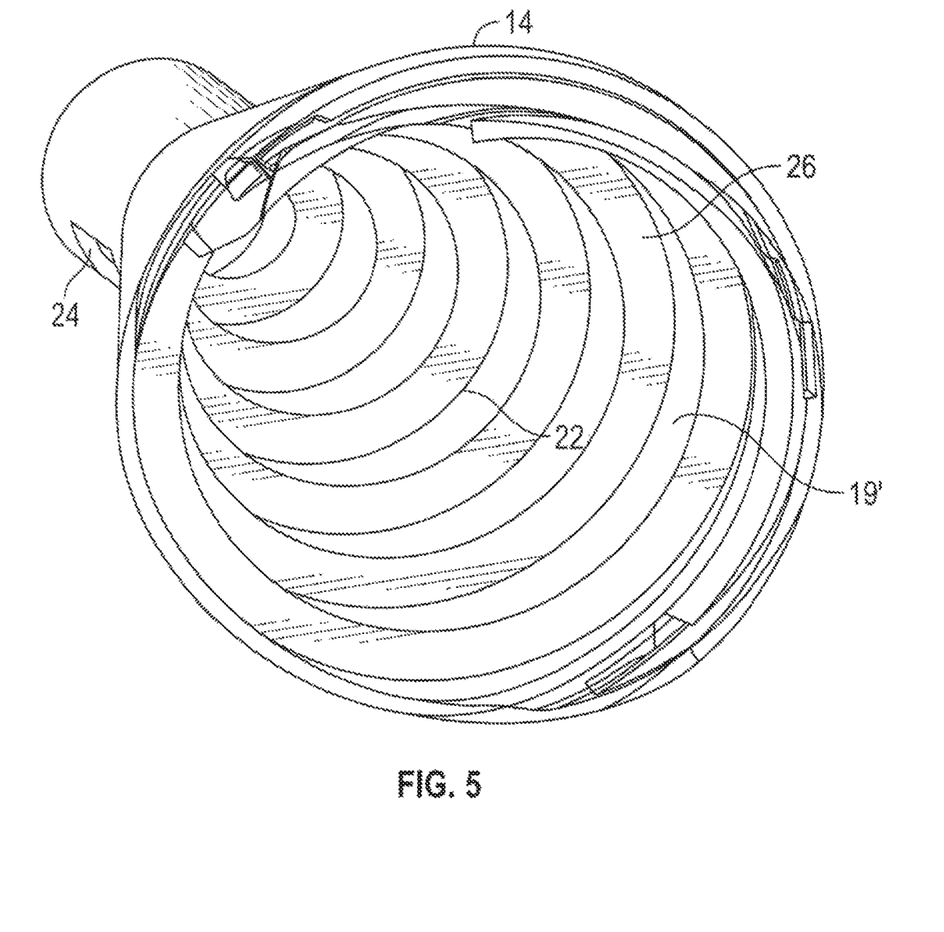
FIG. 5 depicts a sectional view of FIG. 3, along line 5-5.

The spiraling race 26, as shown in more detail the sectional view of FIG. 5 taken along line 5-5 of FIG. 3, extends from a first side edge of race 26 engaged with the interior sidewall 19' of interior cavity 22 of the housing 14. The race 26 extends to a distal edge a distance "L" away from the engagement with the sidewall 19'. So engaged, the race 26 follows a spiral pathway within the interior cavity 22 from the second frustoconical section 15 of the housing to the first frustoconical section 12 and out aperture 24 located at the elevated end housing 14.

When operatively engaged to rotate along a central axis 20 positioned at the noted inclined angle, θ, the race 26 in communication with the supply of individual objects to be dispensed from hopper 21 within the second frustoconical section 15, through frictional engagement with individual pieces or objects, transports respective individual objects or pieces upward within the interior cavity 22 along the spiral race 26 wherein the pieces are ejected individually from the aperture 24 for dispensing.

The frictional properties of the sidewall 19' and/or the spiral race 26 may be modified to provide different levels of singulation for objects of different textures to be dispensed. For example, a textured surface, or dimples, or a pattern of raised dots may be added to the surface if the supply of objects to be singulated has a smoother texture. Singulation of differently sized objects may be achieved by changing the height "L" of the race (see FIG. 5), the cross-sectional aspect, or the pitch (number of spirals) of the race along the housing wall. In combination with the frictional properties of the sidewall and race, these parameters may be altered to service different collections of objects for singulation. Larger objects, for example, will be less likely to climb to the top of the spiral before falling back down due to their mass. Likewise, the race height "L" can be made higher or lower depending on the objects to be dispensed, or it may have a different value along the extent of the race. If the race height "L" is small enough, a certain percentage of objects will tumble backward down the housing as their centers of gravity reside above "L" and they are no longer supported by the race. This is a key feature of a mechanism that supports singulation; as objects progress along the race in the direction of the longitudinal axis, they lift up the sidewall and end up perched atop the particle that had just been below them along the race. Since they are now perched atop a second object, they are more likely to be above the race height "L" and often fall backward, leading to only the piece that had been below continuing up along the race. In this way, groups of objects that might otherwise have been dispensed together are separated and singulated.

The angle, θ, of elevation of the device, as well as the speed of rotation of the device, have a large effect on the characteristics of singulation. In certain embodiments, the parameters of device angle, device speed, race height and pitch, and frictional properties of the race and side walls can be made to lead to not only singulation of objects, but a sorting of objects based on their parameters, e.g. a smaller value of "L" will lead to, on average, smaller pieces being dispensed sooner than larger pieces.

The above described parameters may be adjusted based on the particular application and/or objects to be dispensed.

Figure 6:
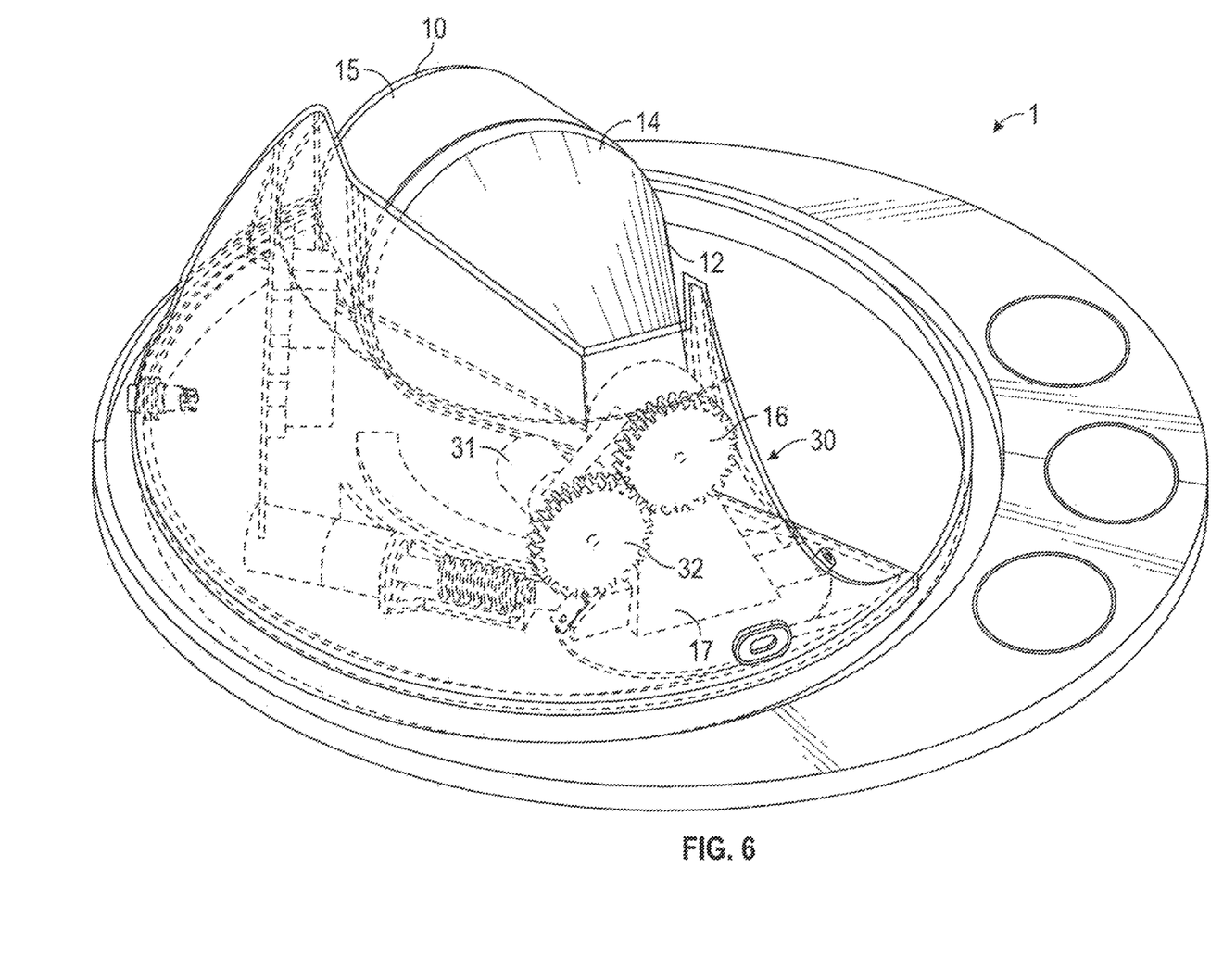
FIG. 6 depicts one mode of the device herein engaged with the component of FIG. 1 which is shown with the outer housing removed.
Figure 7:
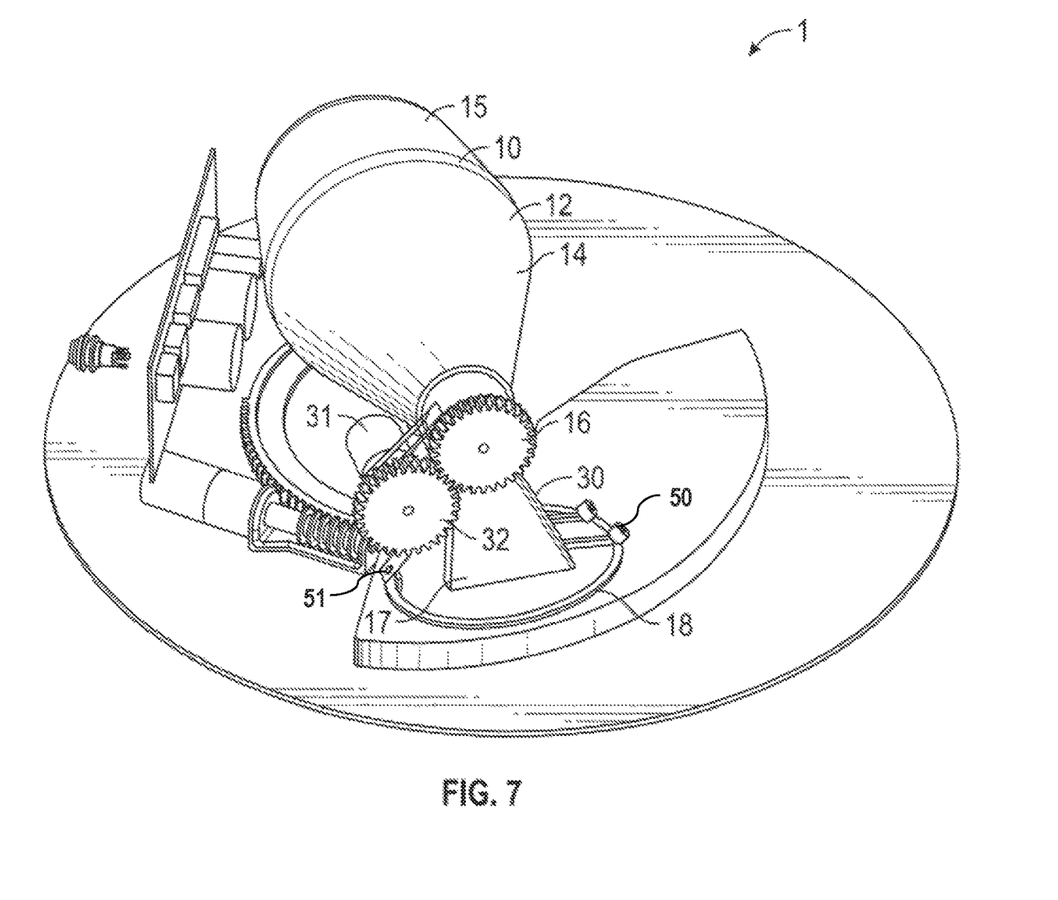
FIG. 7 shows another view of the device as engaged in FIG. 6, showing the gravitational delivery of ejected material or objects from the interior cavity of the housing, through a chute to a dispensing bowl.

The device 10 is shown in one mode of use in FIGS. 6 and 7, where it is incorporated in the animal interactive training system 1, FIG. 1. At the end of second frustoconical section 15 housing 14 is affixed to a mount (not shown) and at the end of first section 12 housing 14 is affixed to mount 30 which together support housing 14 and allow it to rotate about axis 20. This is accomplished by motor 31 driving gear 32 and gear 16 affixed to housing 14. The rotation of gear 16 causes housing 14 to rotate about axis 20. As housing 14 rotates, objects in hopper 21 are propelled along race 26 until they are ejected from the aperture 24 of the housing 14. Once ejected, they travel down chute 17 to a dispensing bowl 18. As noted above, the device 10 may be employed to deliver single units of food to dispensing bowl 18 reliably, no matter the difference in size or mass of the supply.

In certain embodiments a controller in communication with the drive system controls rotation of the housing 14 to dispense objects from the opening in the second end of the first housing portion one object at a time. The controller causes the housing 14 to rotate through one full rotation during which an object may or may not be dispensed based upon the arrangement of objects within the housing and especially at the end of the race 26 where it ends in the opening 24. After the rotation, the controller, in communication with an infrared optical transmitter 50 and an infrared optical sensor 51 senses the reflectance of the bowl 18. The reflectance of an empty bowl and a bowl with an object in it being previously characterized, the controller makes a determination of whether an object has been dispensed in the bowl 18. If it has, the device 10 is not rotated further until the object in the bowl 18 is no longer present (after e.g. being presented to an animal and consumed by the animal). If no object is detected in the bowl 18, the device 10 is rotated again, and the sensing procedure continued until an object is detected to have been dispensed.

Figure 8:
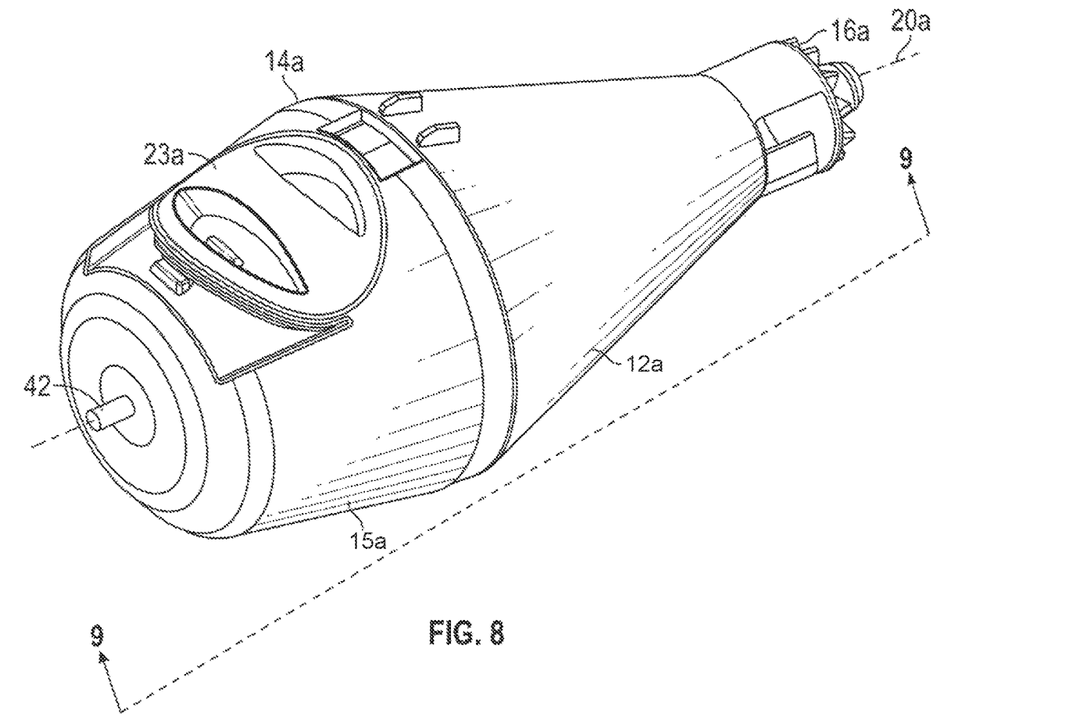
FIG. 8 depicts an alternate embodiment of the frustoconical housing device.
Figure 9:
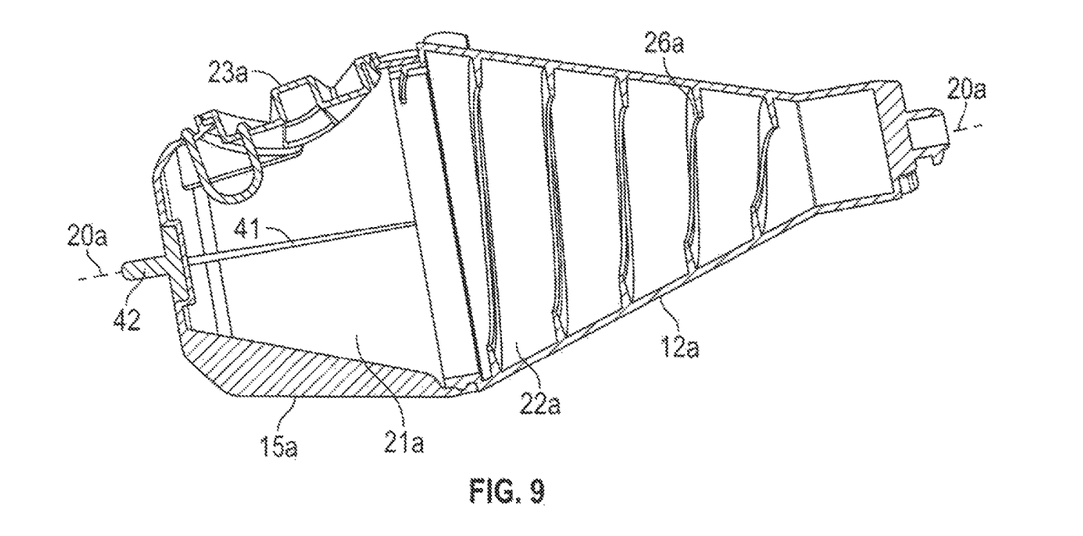
FIG. 9 shows a sectional view of FIG. 8 along line 9-9.

FIGS. 8-13 depict another embodiment of the invention, namely device 10a. As noted, it can be seen in FIG. 8 that the housing 14a can be fitted with a removable door 23a though which new objects can be introduced into hopper 21a of interior 22a of the housing 14a. FIG. 8 also depicts the longitudinal axis 20a formed by mounting the device 10a using a gear 16a affixed to one end of housing 14a and a fixed rotational pivot 42 at the other end of housing 14a. FIG. 9 shows a cross section of FIG. 8 and depicts the spiral race 26a only in the first frustoconical portion 12a of the housing 14a, while the second frustoconical portion 15a of the housing 14a is fitted with aggregating ribs 41 along the sidewalls. The aggregating ribs 41 collect and funnel the objects to be dispensed toward the spiral race 26a. The aggregating ribs 41 have lengths substantially in a direction parallel to the longitudinal axis 20a and widths substantially in a direction perpendicular to the longitudinal axis 20a. The surface of hopper 21a is angled downward toward the beginning of spiral race 26a of first frustoconical section 12a to ensure the items in the hopper 21a are urged toward the race 26a to ensure a constant feeding of items.

Figure 10:
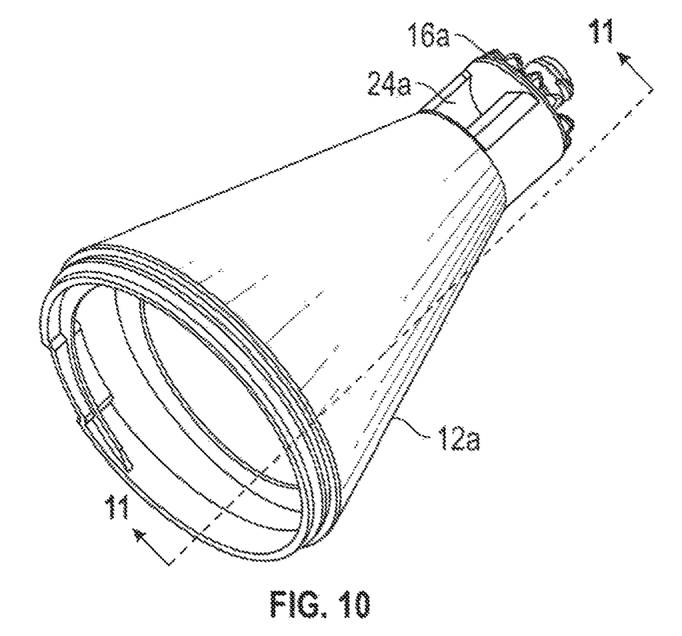
FIG. 10 shows an isometric view of the frustoconical first housing portion.
Figure 11:
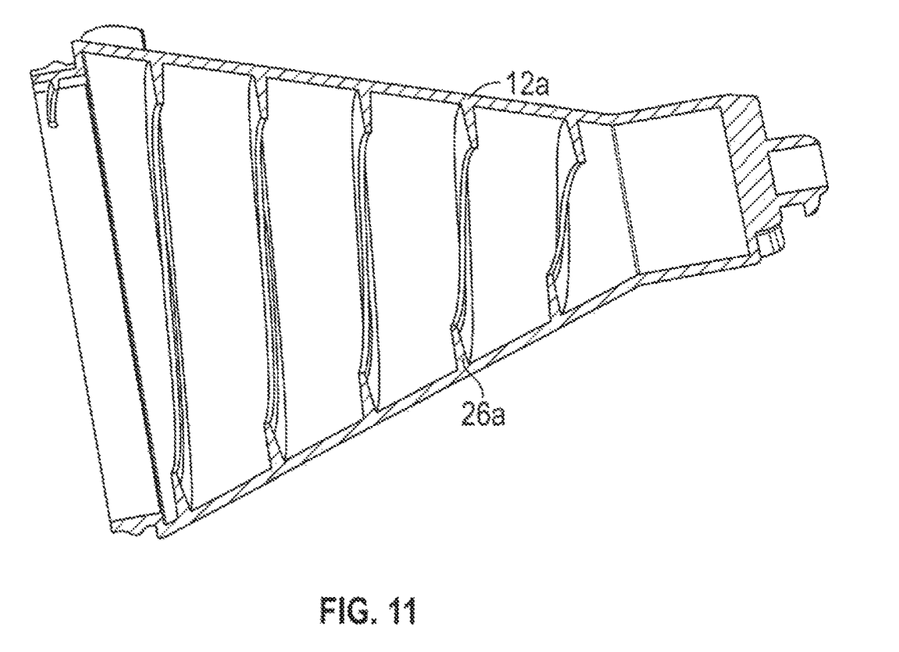
FIG. 11 shows a sectional view of FIG. 10 along line 11-11.
Figure 12:
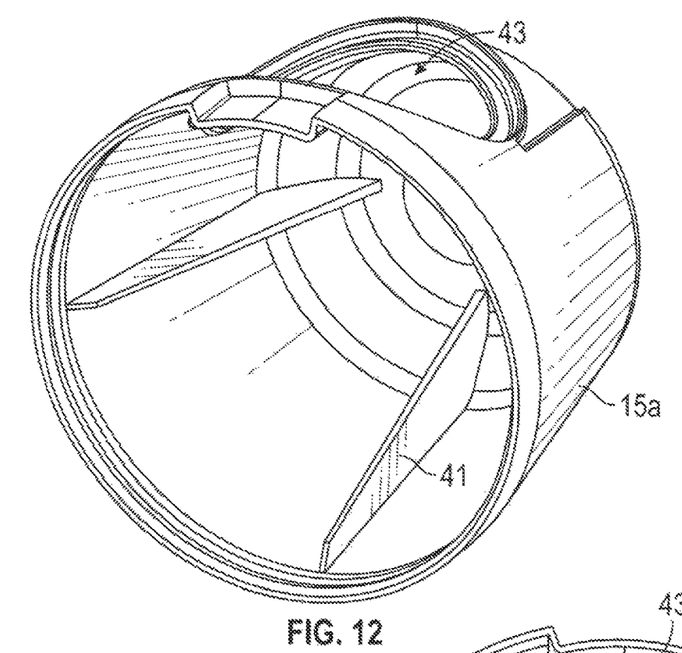
FIG. 12 is an isometric view of the wider, second housing portion.
Figure 13:
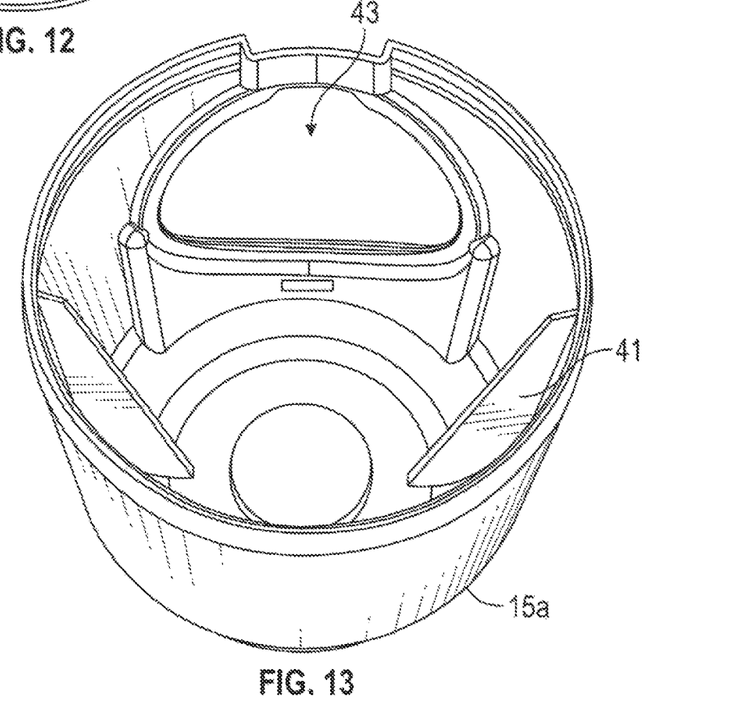
FIG. 13 is a different isometric view of the second housing portion shown in FIG. 12.

FIGS. 10 and 11 show a more detailed view of the first frustoconical portion 12a, including a view of the aperture 24a through which objects are dispensed. FIGS. 12 and 13 depict the interior of the second frustoconical portion 15a of the housing 14a, with multiple views of the aggregating ribs 41. In FIGS. 12 and 13, the removable door 23a is shown removed, providing access to the interior 22a of the housing via aperture 43 when the door 23a is removed.

Figure 14A:
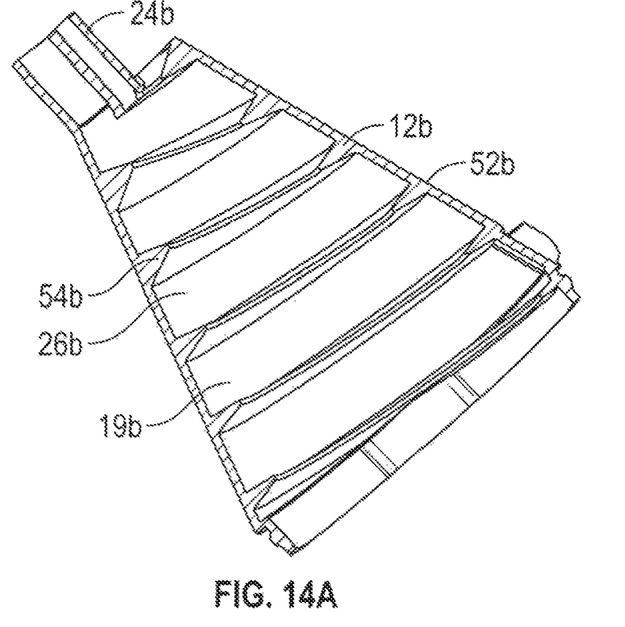
FIGS. 14*a-c* show another embodiment of a frustoconical first housing portion, which is made by two injection molded halves which are combined to form the final assembly.
Figure 14B:
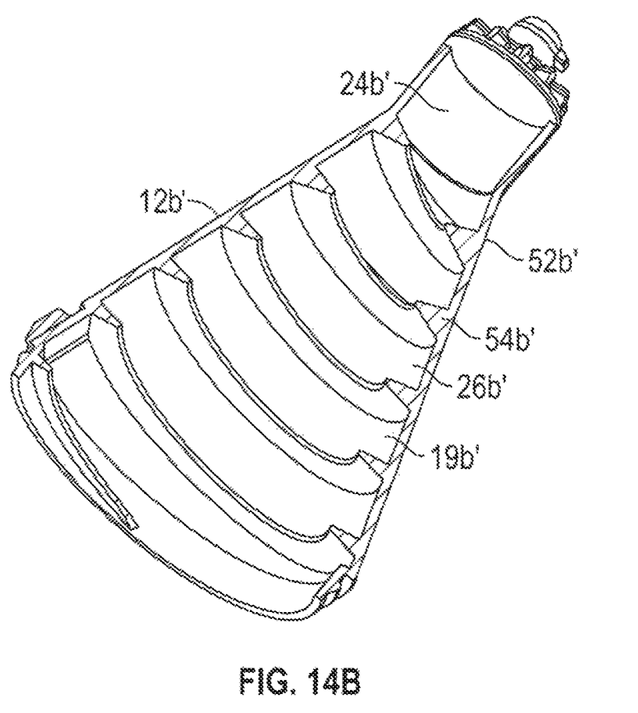
Figure 14C:
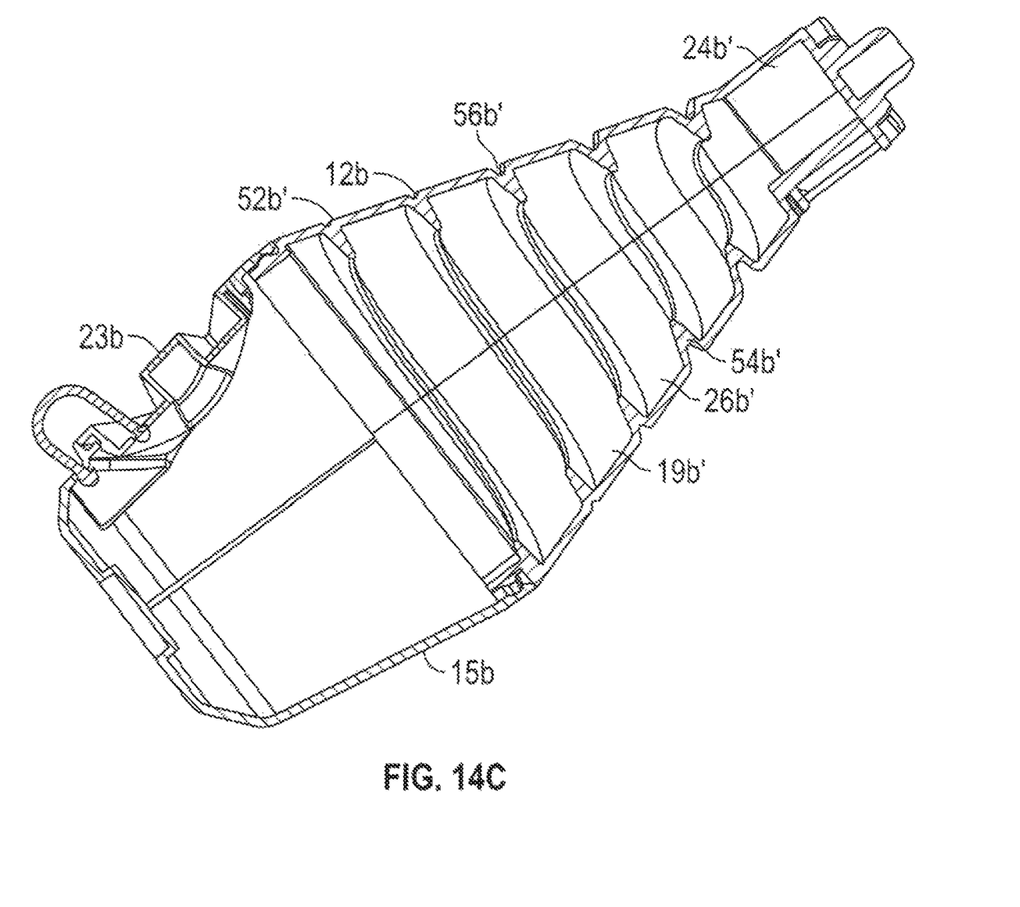

An alternative embodiment in which the device 10 may be modified for production via injection molding techniques, by producing the first narrower section 12b is formed from two separate molded parts, 52b and 52b' (FIGS. 14a and b, respectively), divided longitudinally, are attached to each other permanently subsequent to molding. A similar procedure can be used on the second, wider section 15b as shown in FIG. 14c. In this embodiment, the race 26b and 26b' is defined by protrusions, e.g. protrusion 54b and 54b', formed on the interior surface 19b and 19b' which are indentations in the exterior wall, e.g. 56b' as shown in FIG. 14c. Therefore, housing 14b has a cross section that becomes more triangular in shape as the race 26b and 26b' proceeds from the lower, wider end of the housing 14b to the higher, narrower end of housing 14b.

As noted, any of the different configurations and components can be employed with any other configuration or component shown and described herein. Additionally, while the present dispensing invention has been described herein with reference to particular embodiments thereof, a latitude of modifications, various changes and substitutions are intended in the foregoing disclosures.

Further, it will be appreciated that in some instance some features, or configurations, or steps in formation of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A device for sequentially dispensing individual objects, comprising:
    a housing having a first housing portion which is conically-shaped, the first housing portion having a first end proximate a supply of objects and a second end proximate a location where the objects are to be dispensed; and
    a spiral race, disposed on an interior surface of the first housing portion and extending from the first end to the second end of the first housing portion, along which the objects to be dispensed travel;
    wherein a height of the spiral race causes immediately adjacent objects traveling to the second end to fall over the spiral race toward the first end, thereby sequentially dispensing individual objects;
    wherein the housing comprises a second housing portion with a first end and a second end; wherein the first end of the first housing portion is interconnected with the first end of the second housing portion;
    wherein the second housing portion includes a spiral race disposed on its interior surface which aligns with the spiral race disposed on the interior surface of the first housing portion; the second housing portion holding a supply of objects; and
    wherein the housing has a longitudinal axis and the spiral races on the interior surfaces of the first and second housing portions are disposed about the longitudinal axis.

2. The device of claim 1, wherein the spiral race is removable.

3. The device of claim 1, wherein the first housing portion and the second housing portion are mechanically detachable.

4. The device of claim 1, wherein the second housing portion has a hopper in its interior for holding a supply of objects.

5. The device of claim 4, wherein the interior surface of the hopper is angled to urge the objects toward the first housing portion.

6. The device of claim 4, wherein the second housing portion includes an opening with a mechanically detachable lid through which the supply of objects can be introduced to the hopper.

7. The device of claim 4, wherein the housing has a longitudinal axis and the spiral race on the interior surface of the first housing portion is disposed about the longitudinal axis.

8. The device of claim 7, wherein the second housing portion includes a plurality of aggregating ribs on the interior surface of the second housing portion, the aggregating ribs having lengths substantially in a direction parallel to the longitudinal axis and widths substantially in a direction perpendicular to the longitudinal axis.

9. The device of claim 1, wherein the interior surface of the first housing portion is less smooth than an interior surface of the second housing portion.

10. The device of claim 9, wherein the first end of the first housing portion is wider than the second end of first housing portion.

11. The device of claim 7, wherein the housing is disposed on a mount to enable rotation of the housing about the longitudinal axis; and
    wherein the rotation of the housing causes the objects to travel from the hopper, along the spiral race, to the second end due to frictional engagement between the spiral race and the objects.

12. The device of claim 11, wherein the housing is angled upwards, relative to a surface on which the device is disposed, from the second end of the second housing portion to the second end of the first housing portion.

13. The device of claim 12, wherein the second end of the first housing portion comprises an opening for the exit of the objects.

14. The device of claim 1, wherein the objects to be dispensed are particles of food.

15. The device of claim 14, wherein the particles vary in size.

16. The device of claim 13, further including a drive system configured to cause rotation of the housing.

17. The device of claim 16, further including a controller in communication with the drive system to control rotation of the housing to dispense objects from the opening in the second end of the first housing portion one object at a time.

18. The device of claim 1, wherein the spiral race includes a spiral wall extending from the interior surface of the first housing portion.

19. The device of claim 1, wherein the spiral race extending from the interior surface of the first housing portion is formed by indenting an exterior surface of the first housing portion.

* * * * *